United States Patent [19]

McNutt et al.

[11] Patent Number: 5,649,153

[45] Date of Patent: Jul. 15, 1997

[54] AGGRESSIVE ADAPTION ALGORITHM FOR SELECTIVE RECORD CACHING

[75] Inventors: Bruce McNutt, Gilroy; Ruth Enid Azevedo, San Jose; Gary E. Morain, San Jose; Barrie N. Harding, San Jose, all of Calif.

[73] Assignee: International Business Machines Corporation, Armonk, N.Y.

[21] Appl. No.: 492,430

[22] Filed: Jun. 19, 1995

[51] Int. Cl.$^6$ .................................................. G06F 12/02
[52] U.S. Cl. .................... 395/445; 395/439; 395/440; 395/460; 395/465
[58] Field of Search ................... 395/460, 439, 395/440, 445, 465

[56] References Cited

U.S. PATENT DOCUMENTS

| | | | |
|---|---|---|---|
| 4,503,501 | 3/1985 | Coulson et al. | 364/300 |
| 4,536,836 | 8/1985 | Dodd et al. | 364/200 |
| 4,583,166 | 4/1986 | Hartung et al. | 364/200 |
| 4,638,425 | 1/1987 | Hartung | 364/200 |
| 5,247,653 | 9/1993 | Hung | 395/500 |
| 5,247,683 | 9/1993 | O'Brian et al. | 395/425 |
| 5,253,351 | 10/1993 | Yamamoto et al. | 395/425 |
| 5,317,727 | 5/1994 | Tsuchida et al. | 395/600 |
| 5,325,509 | 6/1994 | Lautzenheiser | 395/425 |
| 5,353,430 | 10/1994 | Lautzenheiser | 395/425 |
| 5,355,478 | 10/1994 | Brady et al. | 395/600 |
| 5,367,653 | 11/1994 | Coyle et al. | 395/400 |
| 5,381,539 | 1/1995 | Yanai et al. | 395/425 |
| 5,403,639 | 4/1995 | Belsan et al. | 395/600 |
| 5,499,354 | 3/1996 | Aschoff et al. | 395/456 |
| 5,530,829 | 6/1996 | Beardsley et al. | 395/440 |

*Primary Examiner*—Eddie P. Chan
*Assistant Examiner*—Vincent Yip
*Attorney, Agent, or Firm*—Berman Collins & Sawyer; Esther E. Klein

[57] ABSTRACT

A cache management system for dynamically switching between record caching and track caching. Statistics are collected within the cache management system to determine the type and amount of locality associated with a specific data set currently within the cache. Using these statistics, metrics of the actual hit ratio, whole-track hit ratio, and other-record-hit ratio are generated. The metrics are periodically reviewed for a given band, and the band is placed into one of three cache modes accordingly. The mode assignment determines what type of staging will be performed for data within the band in the event of a miss. The possible modes are: track mode for track-based staging, record mode for staging of a single record only, or uncached mode if no data is to be staged. If a band has been assigned to either record or track mode, the assignment is re-evaluated after for a predetermined number of I/O's (128). If the band has been assigned to uncached mode, then after another predetermined number of I/O's (4096), the band is reassigned to record mode in order to force an update of the band statistics.

9 Claims, 4 Drawing Sheets

DYNAMIC CACHE MANAGEMENT

110

DYNAMIC CACHE MANAGEMENT

BAND CONTROL OF SELECTIVE RECORD CACHING

AGGRESSIVE ADAPTION ALGORITHM FOR SELECTIVE RECORD CACHING

FIELD OF THE INVENTION

The present invention relates to the storage of data in an external storage subsystem, and more particularly, to a system and method for dynamically switching between record caching and track caching.

BACKGROUND OF THE INVENTION

Large computer systems typically store data on one or more movably mounted disks coated with remanent magnetic material, also known as a direct access storage device (DASD). Either fixed block or variable length records are recorded along circular track extents formatted on the disks. The tracks are concentric such that a movable arm with a read or write head or a switchable set of fixed heads must be positioned or activated over the desired track to effectuate transfer of the records to or from the disk. The set of all tracks that can be accessed without repositioning the access mechanism is termed a "cylinder". For example, a DASD storing 500 tracks per disk would include 500 cylinders. These cylinders may be grouped in logical or arbitrary sets. Contiguous cylinders are grouped together to form "bands" such that cylinders 0–10 might be a first band, 11–100 a second band, etc. For efficient data movement between the computer and the DASD, a track's worth of data or even cylinder's worth of data is transferred at one time from the DASD to another level of storage called a cache.

A cache is a special purpose high speed buffer interposed between a processor and a larger but slower storage device. If data is stored in the cache, then it can be accessed by applications executing on the processor (termed a "hit") in a shorter amount of time than if it were stored in the larger but slower device. If data is not in the cache when referenced (termed a "miss"), then access must be made to the slower device. Cache performance measures include the ratio of the number of hits or misses to the total number of input/output (I/O) requests. These are denominated the "hit ratio" or "miss ratio", respectively. The advantage of caching arises from the tendency of applications to make repeated references to the same data. This clustering of data is termed "locality of reference".

Two types of reference locality are temporal locality and spatial locality. Temporal locality refers to an application's tendency to repeatedly reference the same data record. Spatial locality refers to an application's tendency to reference two or more nearby data records. To increase both cache performance and the hit ratio, conventional methods employed either track caching or record caching depending on whether the data exhibited temporal locality or spatial locality.

Track caching is well suited to take advantage of both temporal and spatial locality. When a record not already contained in the cache is referenced, a track-based cache algorithm proceeds by bringing this record into the cache (staging), together with any other records that follow it on the same track. Preceding records on the same track may also be staged, in some circumstances and/or implementations. A track-based stage enables subsequent hits to occur either to the record that was the immediate target of the stage (temporal locality), or to nearby records (spacial locality). The mixed workloads characteristic of a general-purpose large-system environment usually exhibit both temporal and spacial locality. For this reason, track caching has been the traditional standard for general-purpose storage controls.

For an application with almost no spacial locality, however, there is a lower probability of future references to subsequent records on the same track, while the high miss ratios associated with such data cause large amounts of staging. The advantages of staging records other than the one requested may therefore be outweighed by high staging overhead. The unnecessary staging adds to device utilization, staging path load, and cache memory use.

Record-based caching provides an alternative type of cache service for such data sets. In record caching, only the requested record is brought into the cache. Record caching avoids wasting effort and cache memory to stage unneeded data, while still taking advantage of any temporal locality (repeated references to the same record) exhibited by the application.

The use of record cache has traditionally been restricted to special-purpose storage controls, which access records randomly, such as airline reservations systems or other types of transaction processing facilities, for example. In contrast, general-purpose storage controls have provided track caching, due to its broader applicability.

However, selective use of record-based caching in a general-purpose storage control offers the potential to achieve significant performance advantages. This is because many individual workloads in a general-purpose environment display primarily temporal locality, not spacial locality. A performance advantage can be achieved by selecting record-based caching for these workloads only, and selecting track-based caching for the remaining data.

Many conventional methods exist which changes cache modes to suit the particular data. One method has the ability to select track caching or no caching only through host software, but does not have the ability to select record caching. This method therefore leads to unnecessary staging and inefficient use of the cache.

Another host-software-based method has the capability to switch between track-based caching and record-based caching. The decision to employ record caching, however, is limited. The host software identifies which data sets are processed using record caching mode based only on hit ratios. If the hit ratios are low, then the host assigns record-based caching as a way to reduce the staging load associated with each miss. The host software does not have sufficient information to determine whether the hit ratio enjoyed by a specific data set is primarily due to temporal or to spacial locality because the host does not have access to such data. In other words, the host has no ability to decide why hits are obtained and then to use that information to decide whether to use record caching. The host, therefore, is unable to select record caching for the full range of appropriate data.

Another method first divides a storage device into bands of data, and then selectively assigns track caching to bands based on the hit ratio. If the hit ratio is above a predetermined threshold a band, then track caching is assigned to that band since the number of hits justifies staging. If the hit ratio falls below a predetermined threshold, then track caching is disabled, saving staging cost. As stated above, track caching takes advantage of both temporal and spacial locality. However, this method is not optimized for data sets that have primarily temporal locality.

Accordingly, what is needed is a system and method for dynamically switching between record caching and track caching to enable an aggressive selection of record caching for all appropriate data. The present invention addresses such a need.

SUMMARY OF THE INVENTION

The present invention provides a method and system for dynamically switching between record caching and track caching, wherein a cache management system includes a cache, at least one band for storing tracks of data in the form of records, and where requests are made for a record associated with a particular track from the cache. The method and system further comprises compiling cache statistics that quantify both temporal and spacial locality of the data. From the cache statistics, a plurality of metric ratios are generated. Based on predetermined relationships between the metric ratios, each band is assigned a cache mode. The possible modes are: track mode for track-based staging, record mode for staging of a single record only, or uncached mode if no data is to be staged.

According to the system and method disclosed herein, the present invention reduces use of staging paths, makes more efficient use of the cache, achieves higher cache hit ratios, and lowers data access time, thereby increasing overall system performance.

DETAILED DESCRIPTION

The present invention relates to an improvement in adaptive cache management. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
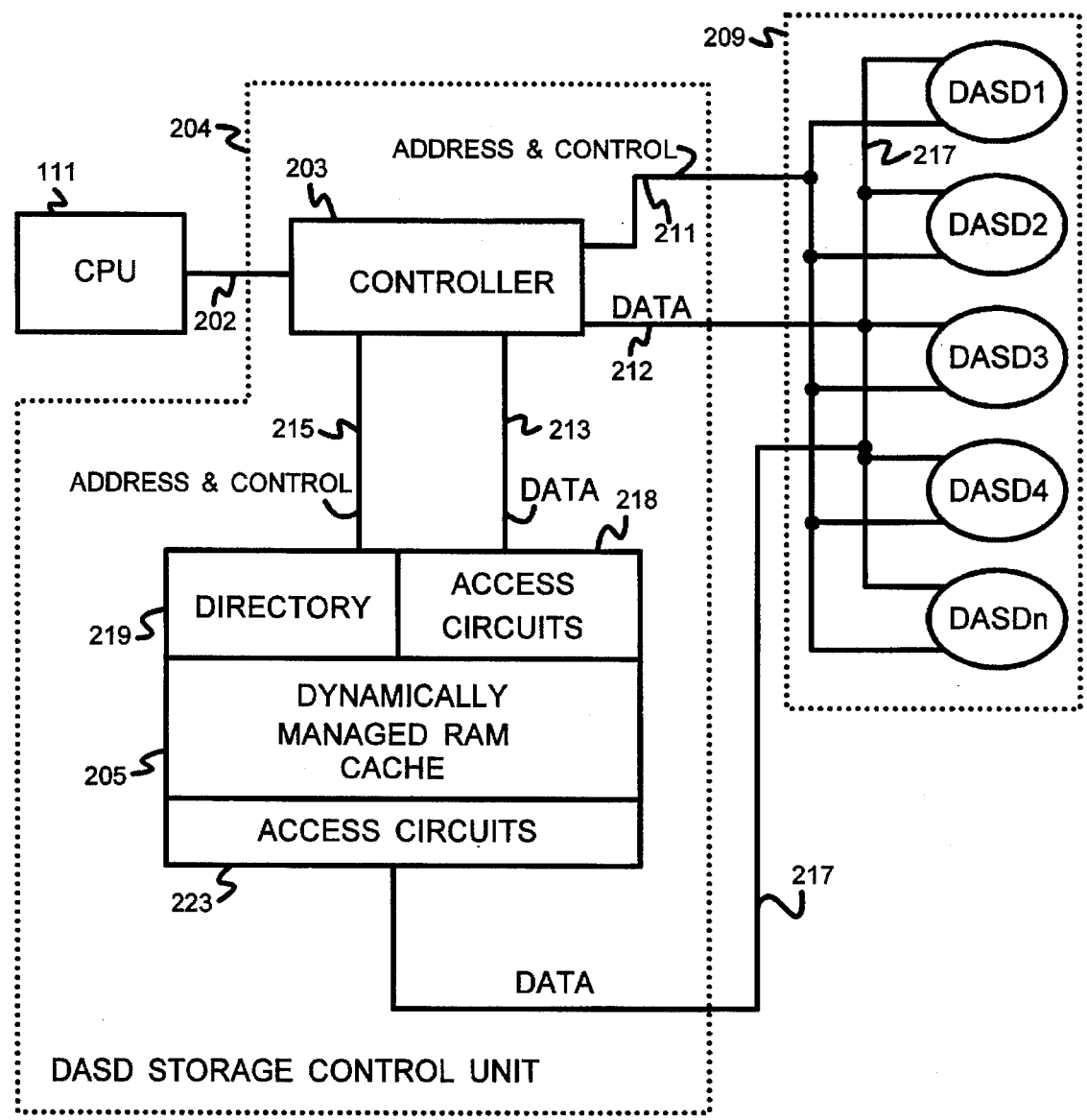
FIG. 1 is a block diagram of a dynamic cache management system in which the present invention resides.

FIG. 1 is a block diagram of a dynamic cache management system 110 in which the present invention resides. The dynamic cache management system 110 includes a host CPU 111, a DASD storage control unit (SCU) 204 and a plurality of DASDs 209 (DASD1–DASDn). Dynamic cache management is implemented in the DASD SCU 204 utilizing controller 203 and the read cache 205. This eliminates the requirement for host system software support. That is, the SCU 204 can adapt its caching behavior based on access characteristics. The CPU 111 accesses the DASD storage control unit 204 over a path 202. Typically, such paths are demand/response or polling interfaces in which the CPU 111 expresses access requests using channel command words, which interpreted by the controller 203. The controller 203 accesses a cache directory 219 over control path 215 and data path 213 to ascertain whether a dataset or portion thereof is resident in the cache 205.

CPU 111 access to external storage involves a virtual processor termed a "channel" on the CPU 111 (not shown), which are chains of channel command words. The CPU 111's interaction with the DASDs 209 (DASD1–DASDn) begins when the CPU 111 invokes a START I/O instruction. This instruction serves to establish a connection between the CPU 111 and an addressed device, and the execution of a channel program within the device. The invocation of the START I/O instruction causes control to be relinquished to a series of channel commands. This series or chain of channel commands is, in turn, sent over the channel to the SCU 204. The controller 203 interprets each channel command word for selecting and accessing the DASDs 209 via directory 219, access circuits 218, 223 and address & control paths 215 and 211. Such access effectuates any data movement across the interfaces between the DASDs 209 and control unit 204 via cache 205, path 217 and path 202, or between cache 205 and CPU 111 via data path 213, controller 203, and path 202.

Each of the DASDs 209 managed by the controller 203 are illustratively divided into sixteen bands of 128 cylinders each. To determine the type and amount of locality associated with a specific data set currently within the cache 205, the controller 203 collects statistics for each band.

According to the present invention, the controller 203 periodically reviews the statistics for a given band, and then places the band into one of three cache modes. The mode assignment determines what type of staging will be performed for data within the band in the event of a miss. The possible modes are: track mode for track-based staging, record mode for staging of a single record only, or uncached mode if no data is to be staged.

If the controller 203 has assigned a band to either record or track mode, the controller 203 waits for a predetermined number of I/O's before re-evaluating the assignment. If the controller 203 has assigned a band to uncached mode, the controller 203 waits some other predetermined number of I/O's, then reassigns the band to record mode in order to force an update of the band statistics. Dynamically assigning cache modes to each band improves overall cache performance over traditional techniques which selectively use either track caching or record caching. The details of dynamically assigning an appropriate cache mode to a given band according to the present invention is provided below.

Figure 2:
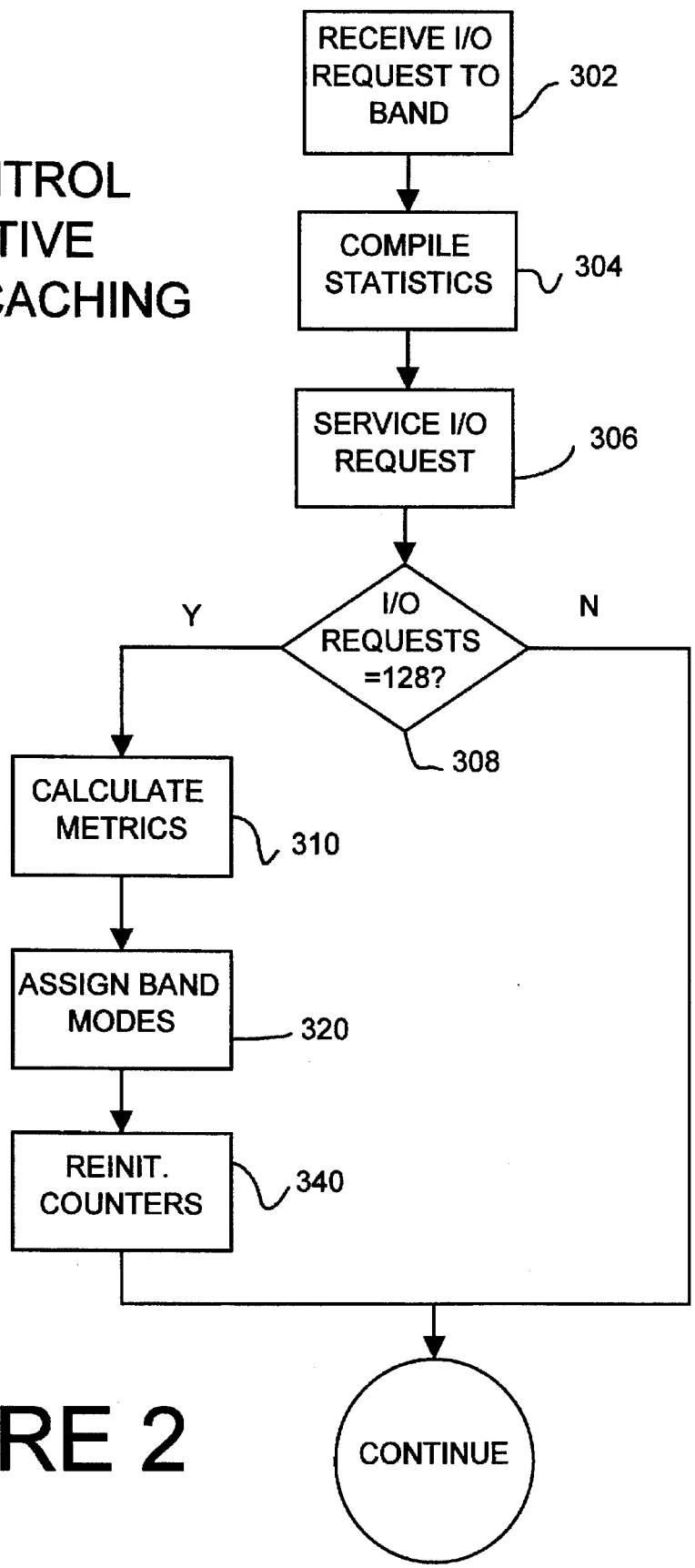
FIG. 2 is a flow chart depicting how the dynamic cache management system implements band control of selective record caching according to the present invention.

Referring now to FIG. 2, a flow chart is shown depicting how the dynamic cache management system 110 of FIG. 1 implements band control of selective record caching according to the present invention. Referring to both FIGS. 1 and 2, selective record caching is performed by placing each band managed by controller 203 into one of the three possible cache modes.

The process begins by the controller 203 receiving an I/O request for a band from the CPU 111 via step 302. The I/O request typically instructs the controller 203 to either read data from, or write data to, the DASDs 209. In the case of a request that attempts to use the cache 205, the controller 203 compiles statistics regarding each attempted access via step 304, which are used to determine the appropriate mode assignment for the band. Statistics are kept for each device on a band basis by not only counting each time a cache "hit" occurs, but also by counting the type of hit that occurred.

After the statistics are compiled, the controller 203 services the I/O request via step 306. In the case of a cache hit, the controller 203 transfers the data from the cache 205 to the CPU 111. In the case of a cache miss, the controller 203 instructs the appropriate DASD 209 to retrieve the data into the cache 205 according to the current cache mode assignment.

The process of assigning band modes to a band is based upon the number of I/O's that have occurred for that band.

The controller 203 maintains an I/O counter of the last number (p) of I/O accesses to a particular band. The I/O counter for the last (p) accesses is incremented by controller 203 anytime the cache is referenced. Once (p) reaches a predetermined limit, the cache mode assignment for the band is reevaluated via steps 310, 320, and 340. In a preferred embodiment, cache mode assignments are evaluated every 128 I/Os.

Cache mode assignments are evaluated by generating metrics via step 310 based upon the statistics generated in step 304. According to the present invention, the metrics include three types of hit ratios, rather than just an overall hit ratio. Using these metrics, the band is then placed into one of the three cache modes according to the temporal and spatial locality displayed via step 320.

The assignment of a mode to a particular band in accordance with the present invention is based upon the statistics and metrics generated in steps 304 and 310. The statistics are compiled through event counters regarding the temporal and spatial locality associated with that band. The event counters are re-initialized to zero at the end of each I/O data-gathering period via step 340 so that statistics may be compiled for the ensuing period.

Figure 3:
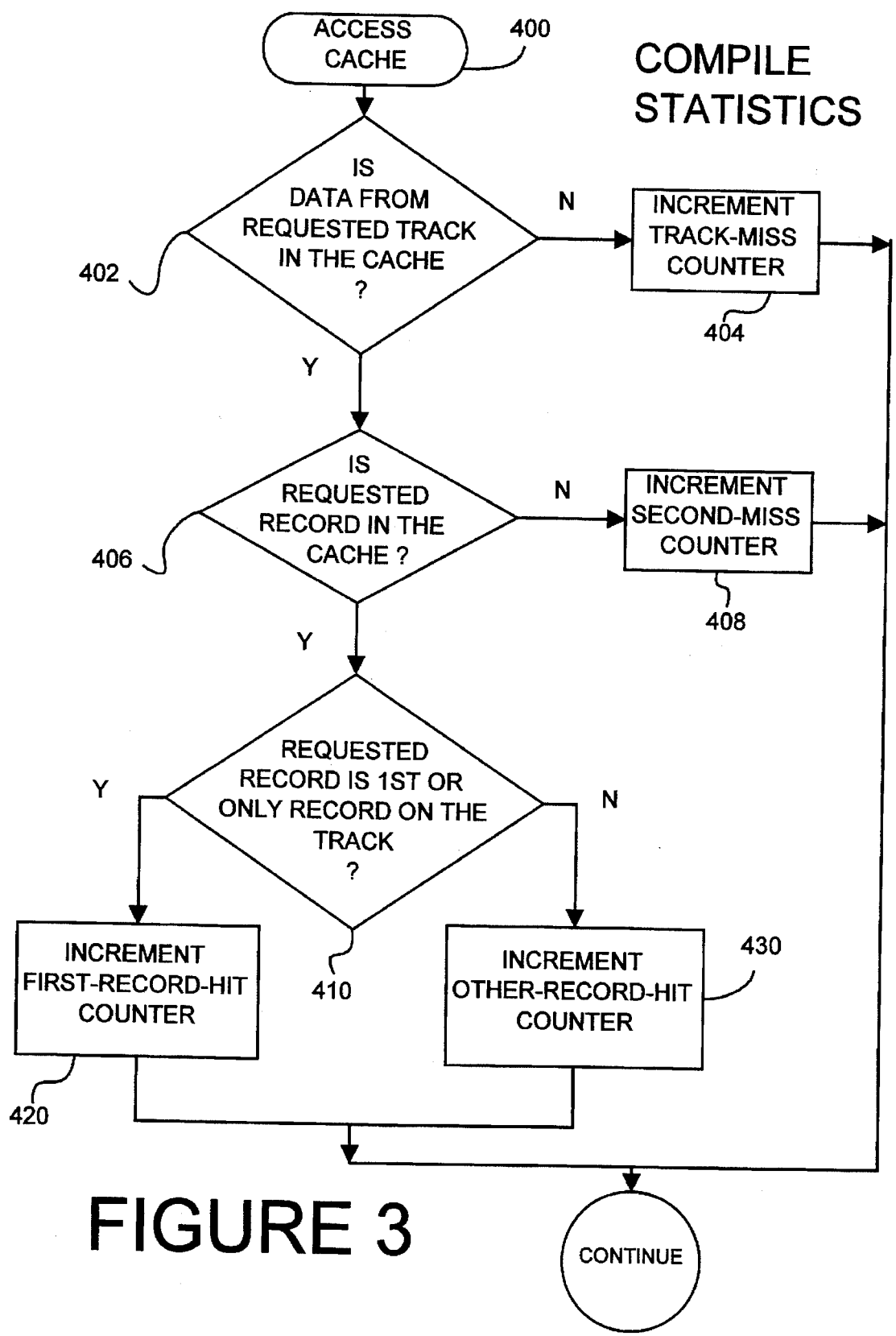
FIG. 3 is a flow chart depicting the steps involved in compiling band statistics.

Referring now to FIG. 3, a flow chart is depicted showing the steps involved in compiling band statistics (step 304 in FIG. 2). In order to quantify temporal and spatial locality, event counters are kept of the number of references to the cache that fall into each of the following four categories: 1) no data from the track corresponding to the requested record is in the cache (a track miss); 2) data from the track corresponding to the requested record is in the cache, but does not include the requested record (a second miss); 3) the requested record is in the cache, and is the first (or only) record belonging to the corresponding track that is in the cache (a first-record hit); 4) the requested record is in the cache, and follows one or more other records belonging to the same track that are also in the cache (an other-record hit). Temporal locality will tend to cause occurrences of event (3), while spacial locality will cause events (2) and (4).

When an I/O instruction attempts to access the cache 205 via step 400, it is determined whether the requested dam is in the cache 205. If record from the track corresponding to the requested record is not in the cache 205 via step 402, then the track-miss counter is incremented via step 404. If data from the track corresponding to the requested record is in the cache 205, then it is determined if the requested record is in the cache 205 via step 406.

If the requested record is not in the cache 205, then the second-miss counter is incremented via step 408. If the requested record is in the cache 205, then it is determined whether the requested record is the first (or only record) in the track via step 410. If so, then the first-record-hit counter is incremented via step 420, otherwise the other-record-hit counter is incremented, indicating the record follows other records on the track.

In another preferred embodiment, a count of the total of the four types of events just described is maintained for use in comparing to (p). In that case, memory can be conserved by not accumulating an explicit count of one of the four types of events just described, since any single one of the four can be obtained by subtraction.

In either embodiment, a table of the statistics is kept for each DASD supported in the cache management system 110. A background process is used to update the event counters which contain a history of accesses for all time for each band on a DASD. Referring again to FIG. 2, the statistics compiled in step 304 are used to calculate the actual hit ratio, the whole-track hit ratio, and the other-record hit ratio, which are used to determine a band's cache mode assignment. These three metrics are updated whenever a band was in track mode or record mode during the most recent (p) I/O's. The three metrics are updated using the event counters just described, as follows.

The actual hit ratio, which is the fraction of requests that resulted in cache hits, equals:

$$\frac{<\text{first-record-hit} + \text{other-record-hit}>}{<\text{total-of-all-events}>}$$

The whole-track hit ratio, which is the fraction of requests for which data from the track corresponding to the requested record was present in the cache, equals:

$$\frac{<\text{second-miss} + \text{first-record-hit} + \text{other-record-hit}>}{<\text{total-of-all-events}>}$$

The whole-track hit ratio is an estimate of the hit ratio of a hypothetical cache that always stages entire tracks.

The other-record-hit ratio, which is the fraction of requests other than first record hits for which data from the track corresponding to the requested record is present in the cache, equals:

$$\frac{<\text{other-record-hit} + \text{second-miss}>}{<\text{other-record-hit} + \text{second-miss} + \text{track-miss}>}$$

The other-record hit ratio is an estimate of the hit ratio of the same hypothetical cache just described, after removing first-record hits. It is used as a predictor of spacial, as distinct from temporal locality.

In one preferred embodiment of the present invention, the above metrics are each calculated by applying the definitions just stated to the most recent (p) I/O's. The present invention maintains an exponentially weighted moving average of each metric, which is reinitialized after any interval spent in uncached mode. As an example, suppose that the other-record hit ratio is being estimated for the most recent (p) I/O's. If, immediately prior to these, the band was uncached, then the other-record hit ratio would be calculated by applying the definition just given to the most recent (p) I/O's. Otherwise, the other-record hit ratio would be updated using both this metric's previous moving-average value as well as the event counts from the most recent (p) I/O's.

In this case, the other-record-hit ratio equals:

$$(1-w)*<\text{other-record-hit}>_{previous}+(w*(<\text{other-record-hits}>/<\text{other-record-hit} +\text{second-miss}+\text{track-miss}>))$$

Here w is a constant having a value between 0 and 1 that determines the relative importance of the most recent observations compared to the previous moving average. In a preferred embodiment, w=50% or 0.5. All three metrics above are calculated in a similar manner to the example just presented, using the same value of w. A band is placed into one of the three cache modes based on examining the most recent values of the three metrics just described.

Figure 4:
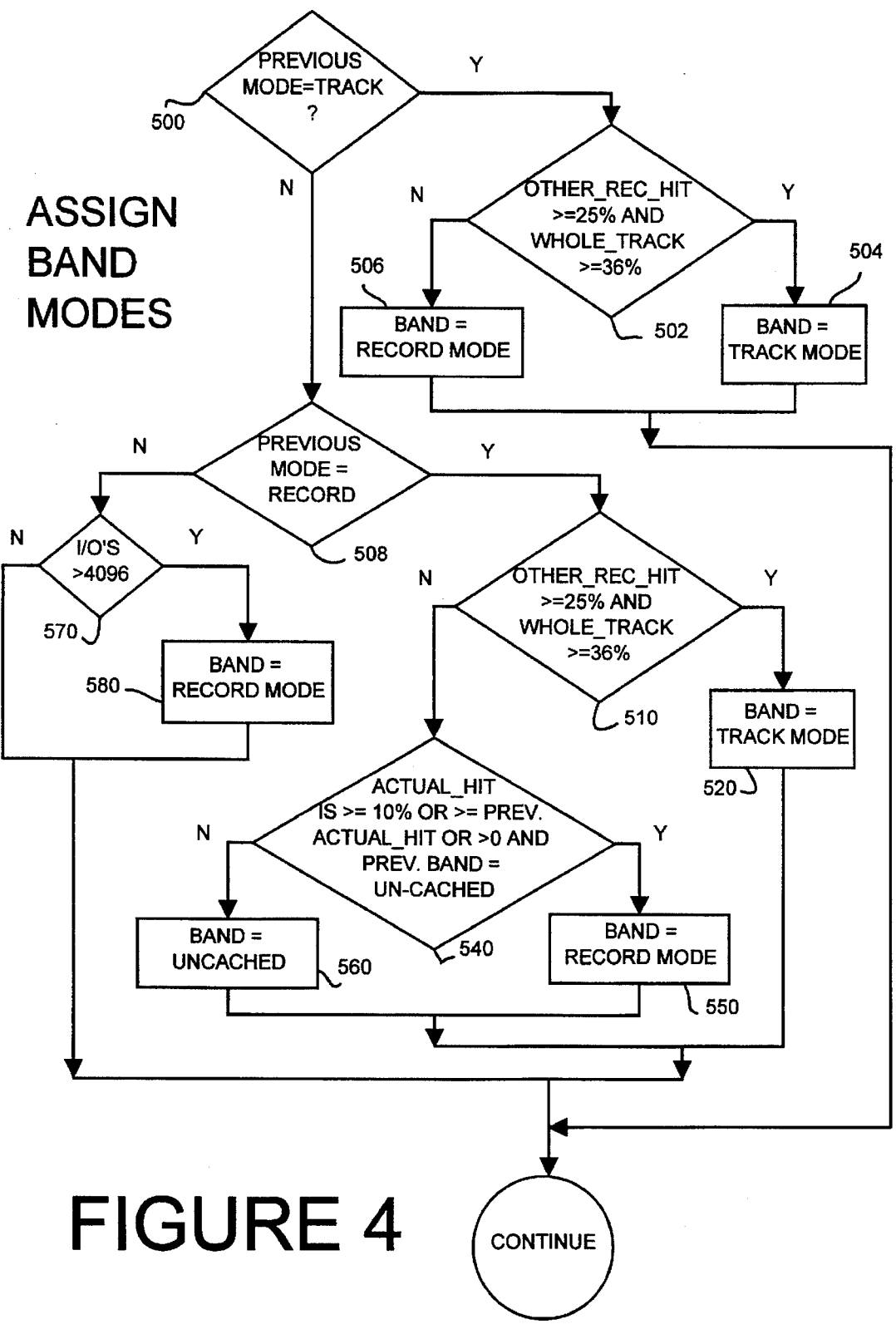
FIG. 4 is a flow chart depicting the steps involved in assigning cache modes according to the present invention.

Referring to FIG. 4, a flow chart is shown depicting the steps involved in assigning a cache mode (step 320 in FIG. 2). A band is selectively placed into track mode, record mode, or uncached mode based the previous cache mode of the band.

If the previous mode of the band was track mode (step 500), then the other-record-hit ratio and whole-track ratio are examined. In a preferred embodiment, if the otherrecord-hit ratio is at least 25% and the whole-track hit ratio is at least 36% (step 502), then the band remains in track mode (step 504). Otherwise, the band is assigned to record mode (step 506). The 25% value for the other-record-hit ratio reflects a compromise between the cost of staging the whole track verses loosing additional hits by not staging the whole track.

If the previous mode of the band was record mode (step 508), and the other-record-hit ratio is at least 25% and the whole-track hit ratio is at least 36% (step 510), then the band is placed to track mode (step 520). Otherwise, the actual hit ratio is examined (step 540). If the actual hit ratio is at least 10%, or if the actual hit ratio has increased since the most recent update of its value, or if the actual hit ratio is greater than zero and the band was uncached prior to the most recent (p) I/O's, then the band remains in record mode (step 550). Otherwise, the band is placed in uncached mode (step 560). The condition checking the actual hit ratio allows the actual hit ratio to increase if already improving. The condition checking if the band was previously uncached is provided because the previous value of the actual hit ratio in this case is not maintained but is assumed to be zero.

If the previous mode of the band was not track mode (step 500) or record mode (step 508), then the previous mode was uncached. The band remains uncached for some number (q) of I/O's (step 570), then the band is reassigned to record mode (step 580) in order to force an update of the band statistics. In a preferred embodiment, caching for the band remains disabled until (q) equals 4096 I/O's.

A method and system in accordance with the present invention has been disclosed that dynamically switches a band between track caching, record caching, or no caching. The purpose of analyzing actual hit ratios, whole-track-hit ratios, and other-record-hit ratios on a band basis is to identify particular data that are not utilizing the cache well and to aggressively apply record caching to all appropriate data, rather than only to data that have a low actual hit ratio. By analyzing more than actual hit ratios and aggressively selecting recording caching, the present invention reduces use of staging paths, makes more efficient use of the cache, achieves higher cache hit ratios, and lowers data access time, thereby increasing total system performance.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined solely by the following claims.

What is claimed is:

1. A method for dynamically switching between record caching and tracking caching, wherein a cache management system includes a cache, and at least one band for storing tracks of data in the form of records, and wherein a request is made for a record associated with a particular track from the cache, the method comprising the steps of:
   a) compiling cache statistics that quantify both temporal and spacial locality of the data by
      a1) maintaining a first count of how many times the cache does not contain records from the track,
      a2) maintaining a second count of how many times the cache contains records from the track other than the requested record,
      a3) maintaining a third count of how many times the requested record is in the cache, and is the first or only record from the track that is in the cache, and
      a4) maintaining a fourth count of how many times the requested record is in the cache and follows at least one other record from the track;
   b) calculating a plurality of metrics from the cache statistics by
      b1) calculating a first fraction of requests that resulted in cache hits,
      b2) calculating a second fraction of requests for which records from the track are in cache, and
      b3) calculating a third fraction of requests other than first record hits for which records from the track are contained in the cache; and
   c) assigning a cache mode to the bands based on predetermined relationships among the plurality of metrics, the cache mode including a track mode, a record mode, and an uncached mode.

2. A method as in claim 1 wherein the step of assigning a cache mode further includes the steps of:
   waiting a predetermined number of cache I/O's; and
   assigning the band to a cache mode based on the band's previous cache mode.

3. A cache management system, comprising:
   a direct access storage device partitioned into bands of tracks for storing a plurality of data records;
   a cache coupled to said direct access storage device, said cache for temporary storage of the data records;
   a processor coupled to said cache for staging data records and tracks from the direct access storage device to the cache and for processing data requests that identify a first record and a first track;
   means for compiling cache statistics that quantity both temporal and spacial locality of the data records on a first band by
      maintaining a first count of how many times the cache does not contain data records from the track,
      maintaining a second count of how many times the cache contains data record from the track other than the requested record,
      maintaining a third count of how many times the first record is in the cache, and is the first or only record from the track that is in the cache, and
      maintaining a fourth count of how many times the first record is in the cache and follows at least one record of the first track;
   means responsive to the compiling means for calculating a plurality of metrics for the first band from the cache statistics by
      calculating a first fraction of requests that resulted in cache hits,
      calculating a second fraction of requests for which records from the track are in the cache, and
      calculating a third fraction of requests other than first record hits for which records from the track are contained in the cache; and
   means responsive to the metric calculation means for assigning a cache mode to the first band based on predetermined relationships among the plurality of metrics.

4. A cache management system as in claim 3 wherein the cache mode assignment means includes means for staging records from the band by track, means for staging single records, and means for disabling cache staging for the band.

5. A cache management system as in claim 4 wherein the processor comprises a cache controller.

6. A method for dynamically switching between record caching and tracking caching, wherein a cache management system includes a cache, and at least one band for storing tracks of data in the form of records, and wherein requests are made for a record associated with a particular track from the cache, the record being a requested record and the associated track being a requested track, the method comprising the steps of:

a) maintaining a first count of how many times the cache does not contain records from the track, b) maintaining a second count of how many times the cache contains record from the track other than the requested record, c) maintaining a third count of how many times the requested record is in the cache, and is the first or only record from the track that is in the cache, and d) maintaining a fourth count of how many times the requested record is in the cache and follows at least one other record from the requested track;

e) calculating a plurality of metrics from the first, second, third, and fourth counts by calculating a first fraction of requests that resulted in cache hits, calculating a second fraction of requests for which records from the track are in the cache, and calculating a third fraction of requests other than first record hits for which records from the track are contained in the cache; and f) assigning a cache mode to the bands based on predetermined relationships among the plurality of metrics.

7. A method as in claim 6 wherein the step of assigning a cache mode switches between caching mode, record caching mode, and uncached mode.

8. A computer readable medium containing program instructions for dynamically switching between record caching and track caching, wherein a cache management system includes a cache, and at least one band for storing tracks of data in the form of records, and wherein a request is made for a record associated with a particular track from the cache, the program instruction for:

a) compiling cache statistics that quantify both temporal and spacial locality of the data by a1) maintaining a first count of how many times the cache does not contain records from the track, a2) maintaining a second count of how many times the cache contains record from the track other than the requested record, a3) maintaining a third count of how many times the requested record is in the cache, and is the first or only record from the track that is in the cache, and a4) maintaining a fourth count of how many times the requested record is in the cache and follows at least one other record from the track;

b) calculating a plurality of metrics from the cache statistics by b1) calculating a first fraction of requests that resulted in cache hits, b2) calculating a second fraction of requests for which records from the track are in the cache, and b3) calculating a third fraction of requests other than first record hits for which records from the track are contained in the cache; and c) assigning a cache mode to the bands based on predetermined relationships among the plurality of metrics, the cache mode including a track mode, a record mode, and an uncached mode.

9. A cache management system as in claim 6 wherein the first count is a count of the number of track misses, the second count is a count of the number of second misses, the third count is a count of the number of first-record hits, and the fourth count is a count of the number of other-record hits, the sum of all the counts being a count of total-of-all-events, and wherein the first fraction of requests that resulted in cache hits equals:

$$\frac{\text{third count} + \text{fourth count}}{\text{sum of all the counts}}$$

the second fraction of requests for which the requested track is in the cache equals:

$$\frac{\text{second count} + \text{third count} + \text{fourth count}}{\text{sum of all the counts}}$$

and the third fraction of requests other than first-record-hits for which the requested track is present in the cache equals:

$$\frac{\text{fourth count} + \text{second count}}{\text{fourth count} + \text{second count} + \text{first count}}.$$

* * * * *